US012533725B2

(12) United States Patent
Zhao et al.

(10) Patent No.: US 12,533,725 B2
(45) Date of Patent: Jan. 27, 2026

(54) LIGHTWEIGHT TWO-CROSSBEAM HIGH-SPEED FREE FORGING HYDRAULIC PRESS

(71) Applicant: Xi'an Jiaotong University, Xi'an (CN)

(72) Inventors: Shengdun Zhao, Xi'an (CN); Baiyang Liu, Xi'an (CN); Shuqin Fan, Xi'an (CN); Ming Chang, Xi'an (CN); Haotian Zhang, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 376 days.

(21) Appl. No.: 18/342,843

(22) Filed: Jun. 28, 2023

(65) Prior Publication Data

US 2024/0216984 A1 Jul. 4, 2024

(30) Foreign Application Priority Data

Dec. 28, 2022 (CN) ........................ 202211708312.9

(51) Int. Cl.

*B30B 15/04* (2006.01)
*B21J 9/02* (2006.01)
*B21J 9/12* (2006.01)
*B30B 1/32* (2006.01)

(52) U.S. Cl.

CPC . *B21J 9/02* (2013.01); *B21J 9/12* (2013.01); *B30B 1/32* (2013.01); *B30B 15/04* (2013.01)

(58) Field of Classification Search

CPC ......... B30B 15/04; B30B 15/16; B30B 15/18; B30B 15/186; B30B 1/32; B21J 9/02; B21J 9/12

See application file for complete search history.

(56) References Cited

U.S. PATENT DOCUMENTS 4,103,611 A * 8/1978 Carlsson ................ B30B 15/18 100/269.08
4,123,929 A * 11/1978 Huydts ..................... B30B 1/32 72/453.08
8,393,193 B2 * 3/2013 Sperrer .................... B21D 5/02 72/389.3

* cited by examiner

*Primary Examiner* — Jimmy T Nguyen
(74) *Attorney, Agent, or Firm* — Leason Ellis LLP

(57) ABSTRACT

Disclosed is a lightweight two crossbeam high-speed free forging hydraulic press. The hydraulic press includes a fixed crossbeam, a movable crossbeam, a column, and a return oil cylinder. By integrating a hydraulic cylinder with a through hole for the column to slide, an annular hydraulic cylinder is formed between the movable crossbeam and the column, and no hole is required to be specially provided on the movable crossbeam for mounting the hydraulic cylinder. Therefore, the rigidity, strength and bending resistance of the movable crossbeam serving as an upper crossbeam or a lower crossbeam can be effectively guaranteed, the crossbeam structure is simplified, and the manufacturing difficulty is reduced. Meanwhile, compared with the existing hydraulic press of a three-crossbeam structure, the two-crossbeam hydraulic press can greatly reduce the overall dimension and mass of the high-speed forging hydraulic press, reduce the overall height of the hydraulic press.

17 Claims, 5 Drawing Sheets

LIGHTWEIGHT TWO-CROSSBEAM HIGH-SPEED FREE FORGING HYDRAULIC PRESS

CROSS-REFERENCE TO RELATED APPLICATION

This patent application claims the benefit and priority of Chinese Patent Application No. 202211708312.9, titled "LIGHTWEIGHT TWO-CROSSBEAM HIGH-SPEED FREE FORGING HYDRAULIC PRESS" filed with the China National Intellectual Property Administration on Dec. 28, 2022, the disclosure of which is incorporated by reference herein in its entirety as part of the present application.

TECHNICAL FIELD

The present disclosure relates to the field of forging equipment, in particular to a lightweight two-crossbeam high-speed free forging hydraulic press.

BACKGROUND

The power source of hydraulic press is generally plunger hydraulic cylinder, and the transmission mode of hydraulic press is usually divided into an up-acting type and a pull-down type. As shown in FIG. 1, a traditional up-acting hydraulic press is provided. The hydraulic press includes an upper crossbeam 1, a lower crossbeam 5, and a movable crossbeam 2. One end of a plunger hydraulic cylinder is fixed to the upper crossbeam 1, and the other end of the plunger hydraulic cylinder pushes the movable crossbeam 2 to move downwards, thus making an upper die 3 and a lower die 4 complete the pressing of a workpiece. As shown in FIG. 2, a traditional pull-down hydraulic press is provided. The hydraulic press includes an upper crossbeam 1, a lower crossbeam 5, and a fixed crossbeam 6. An upper end of a plunger hydraulic cylinder is fixed to the fixed crossbeam 6, and a lower end of the plunger hydraulic cylinder pushes the lower crossbeam 5 to move downwards and to simultaneously pull the upper crossbeam 1 to move downwards through a column, thus making an upper die 3 and a lower die 4 complete the pressing of a workpiece.

It can be seen from the above that the existing hydraulic presses, whether up-acting type or pull-down type, are of a "three-crossbeam" structure, i.e., each including an upper crossbeam, a lower crossbeam, and a movable crossbeam or a fixed crossbeam (depending on the transmission mode). However, the existing three-crossbeam hydraulic press generally has the following shortcomings: in a connection mode of an oil cylinder and a crossbeam, in order to reduce the overall height of the hydraulic press, it is often necessary to mount a height part of the oil cylinder in the middle of an upper crossbeam or a lower crossbeam with holes, e.g., the upper crossbeam as shown in FIG. and the lower crossbeam as shown in FIG. 2. As part of the material in the middle of the crossbeam needs to be hollowed out, the overall structure of the upper crossbeam or the lower crossbeam is damaged, which not only reduces the rigidity and strength of the upper crossbeam or the lower crossbeam and increases the manufacturing difficulty of the upper crossbeam or the lower crossbeam, but also greatly weakens the bending resistance of the upper crossbeam or the lower crossbeam during bending load bearing. Therefore, it is often necessary to increase the height and cross-sectional area of the upper crossbeam or the lower crossbeam for fixing the oil cylinder, which causes the weight increase of the upper crossbeam or the lower crossbeam. In addition, at present, the tonnage of the high-speed forging hydraulic press required for large and medium-sized free forgings is often as high as several thousand tons, even tens of thousands of tons, which makes the crossbeam of the hydraulic press bear huge stress. Therefore, the large-size cast-forged steel crossbeam structure is used to ensure the rigidity and strength of the hydraulic press, which leads to the large size and mass of three crossbeams in the traditional three-crossbeam high-speed forging hydraulic press. For example, in three crossbeams of 80 MN high-speed hydraulic press, the weight of each crossbeam is as high as hundreds of tons, which is costly to manufacture and difficult to mount.

SUMMARY

An objective of the present disclosure is to provide a lightweight two-crossbeam high-speed free forging hydraulic press for solving the following problems of an existing three-crossbeam hydraulic press: the three-crossbeam structure is heavy in weight, and the demand of hollowing out the material at the middle of the crossbeam when an oil cylinder is mounted on an upper crossbeam or a lower crossbeam reduces the rigidity and strength of the upper crossbeam or the lower crossbeam, increases the manufacturing difficulty, and weakens the bending resistance.

In order to achieve the above objective, the present disclosure provides the following solution:

A lightweight two-crossbeam high-speed free forging hydraulic press includes:

- a fixed crossbeam, for being mounted on the ground;
- a movable crossbeam, positioned above or below the fixed crossbeam, wherein an upper die is mounted on the upper one of the movable crossbeam and the fixed crossbeam, a lower die is mounted on the lower one of the movable crossbeam and the fixed crossbeam, and a through hole is provided on the movable crossbeam to serve as an oil cylinder;
- a column, provided between the movable crossbeam and the fixed crossbeam, where a first axial end of the column is fixedly connected to the fixed crossbeam, a second axial end of the column is provided with a first shoulder to form a sliding fit between a flared piston and the oil cylinder, and one end, close to the fixed crossbeam, of the through hole is provided with a sealing element, thus forming an annular closed oil chamber among the first shoulder, the through hole, the column and the sealing element; when a pressure in the annular closed oil chamber rises, hydraulic oil can push the movable crossbeam close to the fixed crossbeam to complete the pressing of a workpiece; and
- a return oil cylinder, connected between the movable crossbeam and the fixed crossbeam for driving the movable crossbeam away from the fixed crossbeam.

Alternatively, the movable crossbeam is located above the fixed crossbeam.

Alternatively, the through hole is a circular through hole, and the column is a cylindrical column.

Alternatively, the sealing element is an annular end face formed by inward retraction of one end of the through hole close to the fixed crossbeam, and the column is in sealing fit with an inner hole of the annular end face by a sealing ring.

Alternatively, the sealing element is a flange, the flange is mounted to one end, close to the fixed crossbeam, of the through hole by a fastener, and the column is in sealing fit with a flange hole by a sealing ring.

Alternatively, two ends of the movable crossbeam each are provided with a through hole.

Alternatively, the movable crossbeam is a “concave” crossbeam, and a notch of the “concave” crossbeam is provided towards the fixed crossbeam. Bulges at two ends of the “concave” crossbeam each are provided with a through hole.

Alternatively, the first axial end of the column is inserted into and in interference fit with the fixed crossbeam. The first axial end of the column is provided with a second shoulder, and a surface of the second shoulder is in contact fit with a surface of one side, close to the movable crossbeam, of the fixed crossbeam.

Alternatively, the first axial end of the column is provided with an external thread, and the first axial end of the column penetrates the fixing crossbeam and then is fixed by a tightening nut. The first axial end of the column is provided with a second shoulder, and a surface of the second shoulder is in contact fit with a surface of one side, close to the movable crossbeam, of the fixed crossbeam.

Alternatively, a cylinder block of the return oil cylinder is connected to the movable crossbeam, and a return plunger of the return oil cylinder is connected to the fixed crossbeam.

Compared with the prior art, the present disclosure has the following technical effects:

In accordance with a lightweight two-crossbeam high-speed free forging hydraulic press provided by the present disclosure, by integrating a hydraulic cylinder with a through hole for a column to slide, an annular hydraulic cylinder is formed between a movable crossbeam and the column, and no hole is required to be specially opened on the movable crossbeam for mounting a hydraulic cylinder. Therefore, the rigidity, strength and bending resistance of the movable crossbeam as an upper crossbeam or a lower crossbeam can be effectively guaranteed, the crossbeam structure is simplified, and the manufacturing difficulty is reduced. Meanwhile, compared with the existing hydraulic press of a three-crossbeam structure, the two-crossbeam hydraulic press can greatly reduce the overall dimension and mass of the high-speed forging hydraulic press, reduce the overall height of the hydraulic press, and achieve the lightweight structure, thereby greatly reducing the mass of moving parts and laying a solid foundation for realizing high-speed forging with high frequency. In conclusion, compared with the traditional three-crossbeam hydraulic press, the present disclosure has the advantages of being light in overall mass of the hydraulic press, small in overall height and dimension of the hydraulic press, small in mass of the moving parts, high in production efficiency, simple in structure of the movable crossbeam, low in cost, large in overall rigidity of the hydraulic press, small in elastic deformation, energy-saving and the like.

Figure 1:
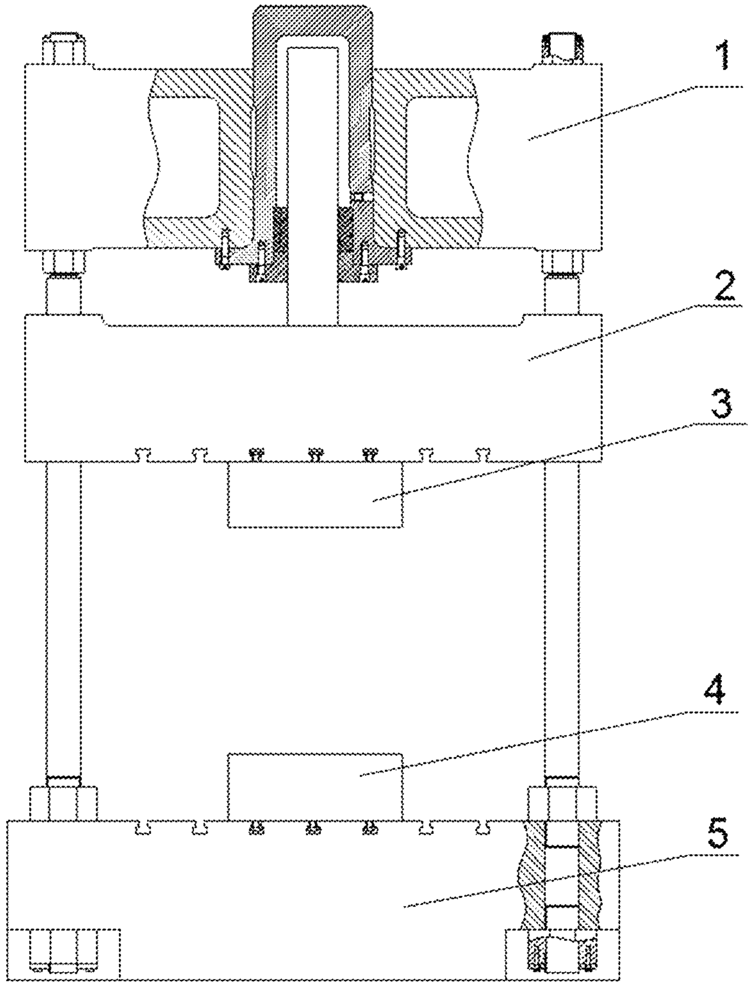
Prior Art FIG. 1
FIG. 1 is a structure diagram of a traditional up-acting hydraulic press.

In the drawings: 1—upper crossbeam, 2—movable crossbeam, 3—upper die, 4—lower die, 5—lower crossbeam, 6—fixed crossbeam, 7—column, 8—first shoulder, 9—through hole, 10—annular closed oil chamber, 11—flange, 12—fixing bolt, 13—nut, 14—return oil cylinder, 15—return plunger, 16—tightening nut, 17—second shoulder, 18—sealing ring.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a lightweight two-crossbeam high-speed free forging hydraulic press for solving the following problems of the existing three-crossbeam hydraulic press: the three-crossbeam structure is high in weight, and the demand of hollowing out the material at the middle of the crossbeam when an oil cylinder is mounted on an upper crossbeam or a lower crossbeam reduces the rigidity and strength of the upper crossbeam or the lower crossbeam, increase the manufacturing difficulty, and weakens the bending resistance.

To make the objectives, features and advantages of the present disclosure more apparently and understandably, the following further describes the present disclosure in detail with reference to the accompanying drawings and the specific embodiments.

Embodiment 1

It is provided a lightweight two-crossbeam high-speed free forging hydraulic press according to an embodiment of the present disclosure. The lightweight two-crossbeam high-speed free forging hydraulic press mainly includes a fixed crossbeam 6, a movable crossbeam 2, a column 7, and a return oil cylinder 14. The fixed crossbeam 6 is used for being mounted on the ground, the movable crossbeam 2 is located above or below the fixed crossbeam 6, an upper die 3 for pressing a workpiece is mounted on the upper one of the movable crossbeam 2 and the fixed crossbeam 6, and a lower die 4 matched with the upper die 3 is mounted on the lower one of the movable crossbeam 2 and the fixed crossbeam 6. A through hole 9 is provided on the movable crossbeam 2 as an oil cylinder. The column 7 is provided between the movable crossbeam 2 and the fixed crossbeam 6, and generally located at positions close to the edges of the movable crossbeam 2 and the fixed crossbeam 6. A first axial end of the column 7 is fixedly connected to the fixed crossbeam 6, a second axial end of the column 7 is provided with a first shoulder 8 to form a sliding fit between a flared piston and the oil cylinder. The first shoulder 8 is an outer convex shoulder formed by protruding an end part of the column 7. One end, close to the fixed crossbeam 6, of the through hole 9 is provided with a sealing element, and an annular cavity gap is formed between the column 7 and the through hole 9 between the first shoulder 8 and the sealing element. Two axial ends of the annular cavity gap are respectively sealed by the first shoulder 8 and the sealing element, thus forming an annular closed oil chamber 10. When a pressure in the annular closed oil chamber 10 rises, the movable crossbeam 2 can be pushed close to the fixed crossbeam 6, thus making the upper die 3 and the lower die 4 close to each other to complete the pressing of the workpiece. The return oil cylinder 14 is connected between the movable crossbeam 2 and the fixed crossbeam 6 for driving the movable crossbeam 2 away from the fixed crossbeam 6 and resetting the movable crossbeam 2. Compared with the traditional hydraulic press, the hydraulic press provided by this embodiment is a two-crossbeam hydraulic press. By integrating a hydraulic cylinder with a column sliding cavity, an annular hydraulic cylinder is formed between the movable crossbeam and the guide column, and no hole is required to be specially opened on the movable crossbeam for mounting the hydraulic cylinder. Therefore, the rigidity, strength and bending resistance of the movable crossbeam as the upper crossbeam or the lower crossbeam can be effectively guaranteed, and the manufacturing difficulty is reduced. Meanwhile, compared with the existing three-crossbeam structure, the weight of the two-crossbeam structure in this embodiment is greatly reduced, and the manufacturing cost and mounting difficulty are reduced accordingly.

Figure 3:
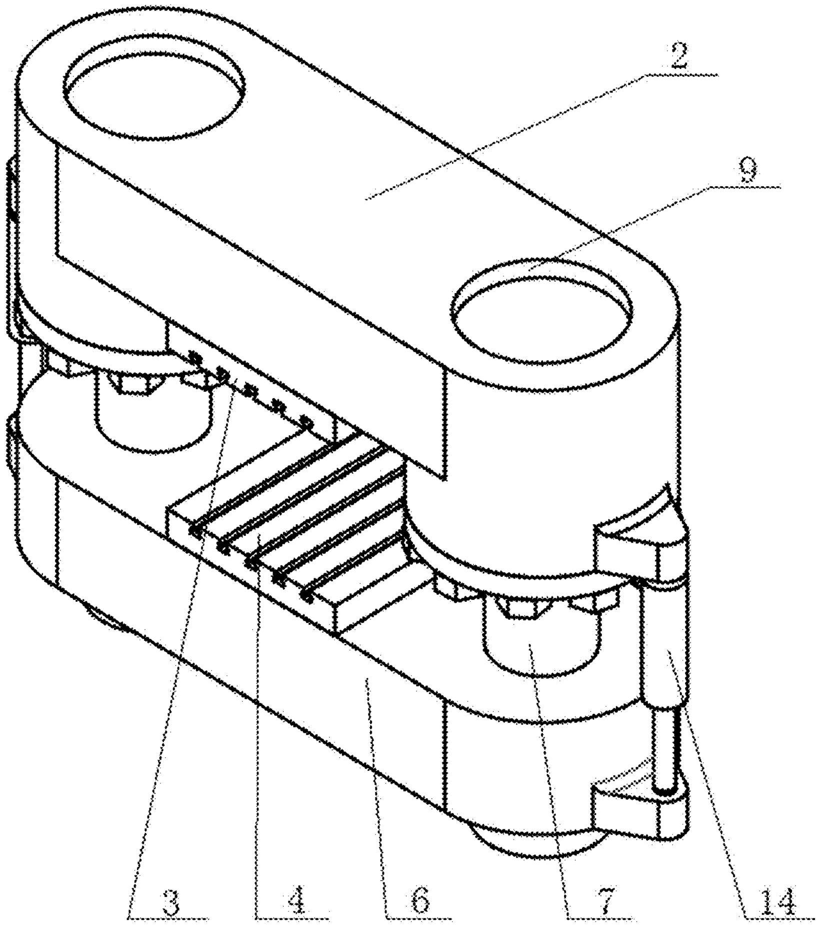
FIG. 3 is a schematic diagram of an overall structure of a lightweight two-crossbeam high-speed free forging hydraulic press according to an embodiment of the present disclosure.
Figure 4:
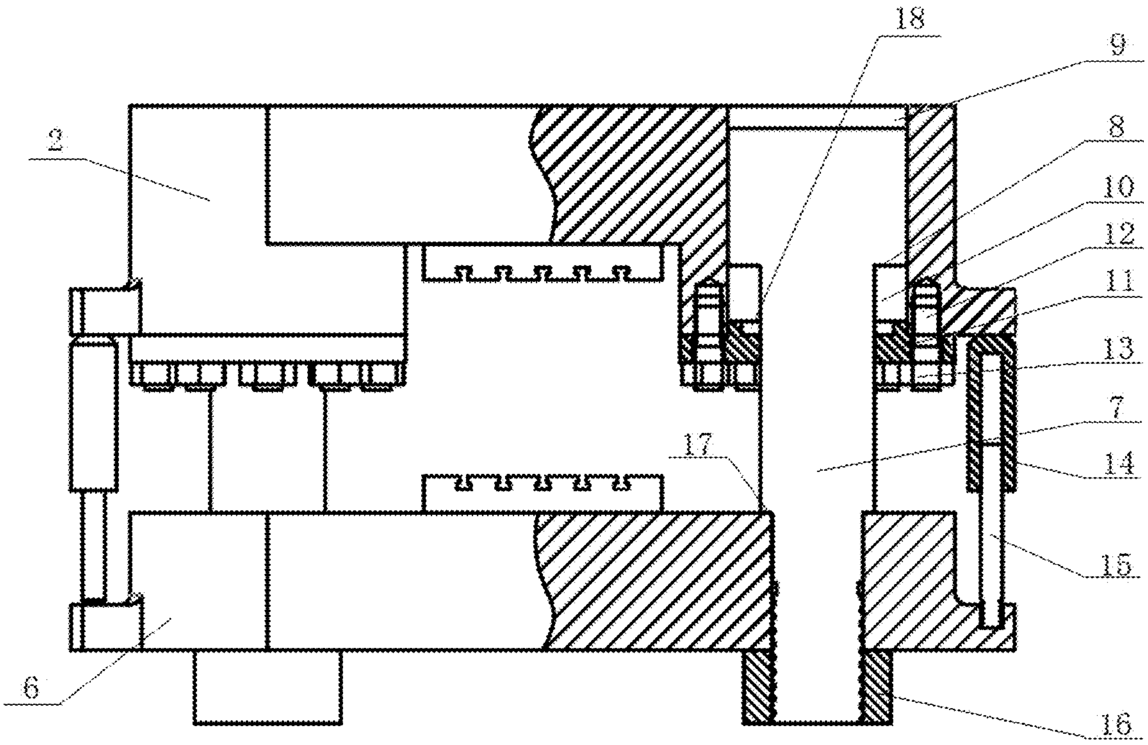
FIG. 4 is a front view of a lightweight two-crossbeam high-speed free forging hydraulic press according to an embodiment of the present disclosure.
Figure 5:
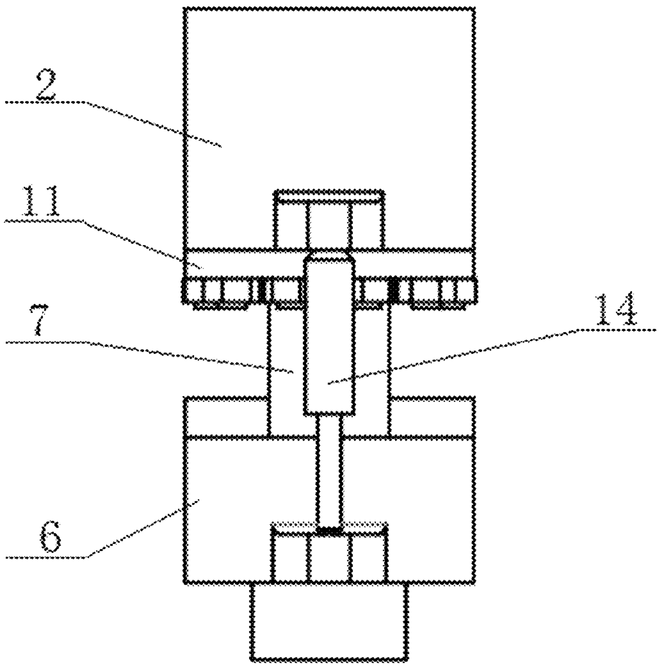
FIG. 5 a side view of a lightweight two-crossbeam high-speed free forging hydraulic press according to an embodiment of the present disclosure.
Figure 6:
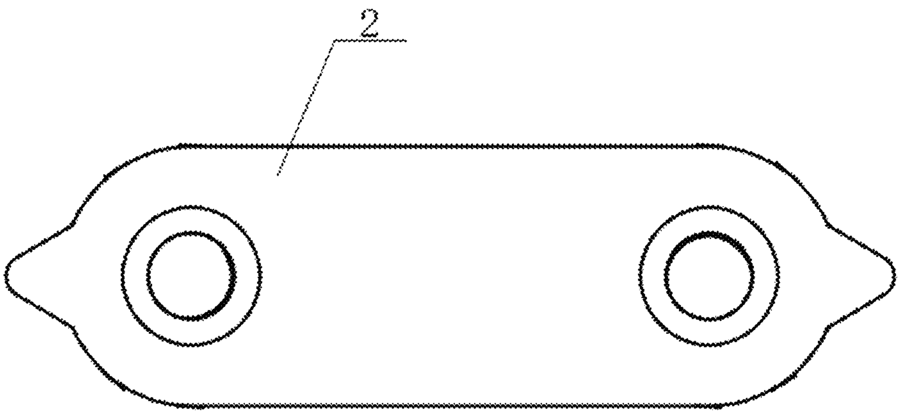
FIG. 6 is a top view of a lightweight two-crossbeam high-speed free forging hydraulic press according to an embodiment of the present disclosure.

In this embodiment, the movable crossbeam 2 is located above or below the fixed crossbeam 6. When the movable crossbeam 2 is located above the fixed crossbeam 6, the overall lightweight two-crossbeam high-speed free forging hydraulic press is located on the ground, while when the movable crossbeam 2 is located below the fixed crossbeam 6, the overall movable crossbeam 2 is located underground. As a preferred mode, the movable crossbeam 2 is generally arranged above the fixed crossbeam 6, that is, in the lightweight two-crossbeam high-speed free forging hydraulic press disclosed in this embodiment, the movable crossbeam 2 serves as an upper crossbeam, and the fixed crossbeam 6 serves as a lower crossbeam, as shown from FIG. 3 to FIG. 5.

Further, in this embodiment, more than two through holes 9 are generally provided on the movable crossbeam 2 and are evenly distributed on the periphery of the movable crossbeam 2. The number of columns 7 arranged on the fixed crossbeam 6 is generally the same as the number of through holes 9, and the columns 7 correspond to the through holes 9 one by one. After the assembly of the lightweight two-crossbeam high-speed free forging hydraulic press is completed, the columns 7 are distributed near the outer edges of the upper die 3 and the lower die 4. As a preferred solution, the through hole 9 is preferably a circular through hole, the column 7 is preferably a cylindrical column, the first shoulder 8 is an annular shoulder arranged coaxially with the cylindrical column, and the outer diameter of the annular shoulder is greater than the outer diameter of the cylindrical column. Taking the movable crossbeam 2 as the upper crossbeam as an example, the first shoulder 8 is correspondingly provided at a top of the column 7, and the column 7 above the first shoulder 8 is a flared piston, and an outer wall of the flared piston is in sliding contact with an inner wall of the through hole 9.

In this embodiment, the above sealing element is an annular end face formed by inward retraction of one end of the through hole 9 close to the fixed crossbeam 6. The annular end face and the movable crossbeam 2 are of an integrated structure, and the column 7 can be in sealing fit with an inner hole of the annular end face by a sealing ring 18. In addition to that, the sealing member may also be a flange 11. The flange 11 is mounted to one end, close to the fixed crossbeam 6, of the through hole 9 by a fastener, and the column 7 is in sealing fit with a flange 11 hole by a sealing ring 18. The fastener for mounting the flange 11 may include a fixing bolt 12 and a nut 13, and one end of the fixing bolt 12 is connected to the movable crossbeam 2. After the flange 11 is inserted into the other end of the fixing bolt 12, the nut 13 is screwed with the fixing bolt 12, thereby achieving the mounting and fixing of the flange 11 on the movable crossbeam 2.

Further, in this embodiment, the movable crossbeam 2 is a strip-shaped crossbeam. Through holes 9 are respectively provided on two ends of the crossbeam, and are symmetrically arranged. Further, in order to reduce the weight and dimension of the movable crossbeam 2 and ensure that the stroke of the oil cylinder can satisfy the pressing stroke of a die, the movable crossbeam 2 is provided as a "concave" crossbeam. Taking the movable crossbeam 2 as an upper crossbeam as an example, a notch of the crossbeam is downward, and an upper die 3 is mounted at the notch position. Bulges at two ends of the crossbeam are respectively provided with a through hole 9, and each through hole 9 is provided in a manner of penetrating through upper and lower surfaces of the movable crossbeam 2.

In this embodiment, the first axial end of the column 7 is fixedly connected to the fixed crossbeam 6, and the "fixed connection" here can be a detachable fixed connection or a non-detachable fixed connection. The non-detachable fixed connection is mainly embodied in the form that the first axial end of the column 7 is welded to, in interference fit with, or integrally formed with fixed crossbeam 6, and the detachable fixed connection is embodied in the form that the first axial end of the column 7 is connected to the fixed beam 6 in a threaded manner or by a connector. For example, the first axial end of the column 7 is connected to the fixed crossbeam 6 by a connector, the first axial end of the column 7 may be provided with an external thread, and after penetrating through the fixed crossbeam 6, the end is screwed with a tightening nut 16 to achieve the connection and fixation of the column 7 to the fixed crossbeam 6. After the tightening nut 16 is unscrewed, the column 7 can be immediately dismounted from the fixed crossbeam to achieve the separation and dismounting of the column 7 from the fixed crossbeam 6. As the column 7 is fixedly connected to the fixed crossbeam 6, when the oil pressure in the annular closed oil chamber 10 changes, the column 7 is still fixed relative to the ground.

In this embodiment, the first axial end of the column 7 is provided with a second shoulder 17. Taking the column 7 as a cylindrical column as an example, the second shoulder 17 is formed by inward retraction of the first axial end of the column 7 in the original axis diameter, and the second axial end is provided with a first shoulder 8 to cooperate with the column 7, thus making the overall cylindrical column specifically shaped into a third-order axis structure. Taking the fixed crossbeam 6 as a lower crossbeam of the lightweight two-crossbeam high-speed free forging hydraulic press as an example, no matter which way the first axial end of the column 7 is fixedly connected to the fixed crossbeam 6, the second shoulder 17 is located above the fixed crossbeam 6. When the column 7 and the fixed crossbeam 6 are in normal assembly and use state, a lower surface of the second shoulder 17 is in contact fit with a surface of one side, close to the movable crossbeam 2, of the fixed crossbeam 6, i.e., in contact with an upper surface of the fixed crossbeam 6, thus playing a role in supporting the weight of the equipment.

In this embodiment, a cylinder block of the return oil cylinder 14 is connected to the movable crossbeam 2, and a return plunger 15 of the return oil cylinder 14 is connected to the fixed crossbeam 6. As a preferred solution, the return oil cylinder 14 is arranged at the peripheries of the movable crossbeam 2 and the fixed crossbeam 6, and connection lugs are provided on the peripheries of both the movable crossbeam 2 and the fixed crossbeam 6. The cylinder block and the return plunger 15 of the return oil cylinder 14 are respectively connected to the connection lugs on the movable crossbeam 2 and the fixed crossbeam 6. In practice, multiple return oil cylinders 14 can be evenly arranged on the peripheries of the movable member 2 and the fixed member 6.

As can be seen from the above, the lightweight two-crossbeam high-speed free forging hydraulic press disclosed in this embodiment has only a fixed crossbeam and a movable crossbeam, in particular to a new solution of the lightweight two-crossbeam high-speed forging hydraulic press which only has a fixed crossbeam (usually also a lower crossbeam) relatively fixed with respect to the ground and a movable crossbeam with a power hydraulic cylinder. The hydraulic cylinder of the power source of the high-speed forging hydraulic press provided by the new solution is an annular new structure with a fixed column in the center. Taking the fixed crossbeam 6 as the lower crossbeam and the movable crossbeam 2 as the upper crossbeam as an example, the working principle of the above two-crossbeam high-speed free forging hydraulic press is explained in detail below.

When in use, the column 7 is fixed with the fixed crossbeam 6, the column 7 at the upper part of the first shoulder 8 is in sliding fit with the through hole 9, and an annular closed oil chamber 10 is formed among the first shoulder 8, the through hole 9, the flange 11 and the column 7 at the lower part of the first shoulder 8. In the process of pressing a workpiece, a conventional hydraulic device can be used to introduce high-pressure oil into the annular closed oil chamber 10, and the flange 11, under the pressure of the high-pressure oil, drives the connected movable crossbeam 2 to move downwards, thus making the upper die 3 and the lower die 4 close to each other to complete the pressing of the workpiece. The return plunger 15 is threaded to the fixed crossbeam 6, and after the pressing of the workpiece is completed, the high-pressure oil can be filled into the cylinder block of the return oil cylinder 14, and the cylinder block of the return oil cylinder 14 moves upwards relative to the return plunger 15 under the pressure of the high-pressure oil, and pushes the movable crossbeam 2 to move upwards to complete the return.

In the two-crossbeam hydraulic press proposed in this technical solution, no additional hydraulic cylinder is provided in the center of the used movable crossbeam, but an annular hydraulic cylinder is formed between the movable crossbeam and the column, and it is unnecessary to provide a special through hole for the hydraulic cylinder to pass through in the center of the movable crossbeam. Meanwhile, in the technical solution, the two-crossbeam structural design can greatly reduce the overall dimension and mass of the high-speed forging hydraulic press, reduce the overall height of the hydraulic press and achieve the lightweight structure, thus greatly reducing the mass of moving parts and laying a solid foundation for realizing high-speed forging with high frequency. Compared with the traditional three-crossbeam hydraulic press, the technical solution has the advantages of being light in overall mass of the hydraulic press, small in overall height and dimension of the hydraulic press, small in mass of the moving parts, high in production efficiency, simple in structure of the movable crossbeam, low in cost, large in overall rigidity of the hydraulic press, small in elastic deformation, energy-saving and the like, specifically as follows:

1. The Overall Weight of the Hydraulic Press is Reduced by about One Third

Compared with the traditional up-acting hydraulic press, the upper crossbeam is canceled in this technical solution, which reduces the overall mass of the hydraulic press by hundreds of tons, thereby greatly reducing the overall weight of the hydraulic press, facilitating the manufacture and mounting of the equipment, and reducing the equipment cost.

2. The Overall Height of the Hydraulic Press is Reduced by about Half

In the traditional up-acting three-crossbeam high-speed forging hydraulic press shown in FIG. 1, a movable crossbeam and an upper crossbeam above the movable crossbeam are above the ground, thus the overall height of the three-crossbeam high-speed forging hydraulic press above the ground includes the movable crossbeam and the upper crossbeam, leading to large dimension, high center of gravity of the hydraulic press, and poor operation stability. Compared with the traditional hydraulic press, the traditional design of disposing a hydraulic oil cylinder between the upper crossbeam and the movable crossbeam is canceled in this technical solution, an annular oil cylinder is provided between the column and the movable crossbeam, thereby reducing the height dimension above the movable crossbeam in the traditional three-crossbeam hydraulic press, greatly reducing the overall height of the hydraulic press, lowering the center of gravity of the equipment, and improving the operation stability of the equipment.

Figure 2:
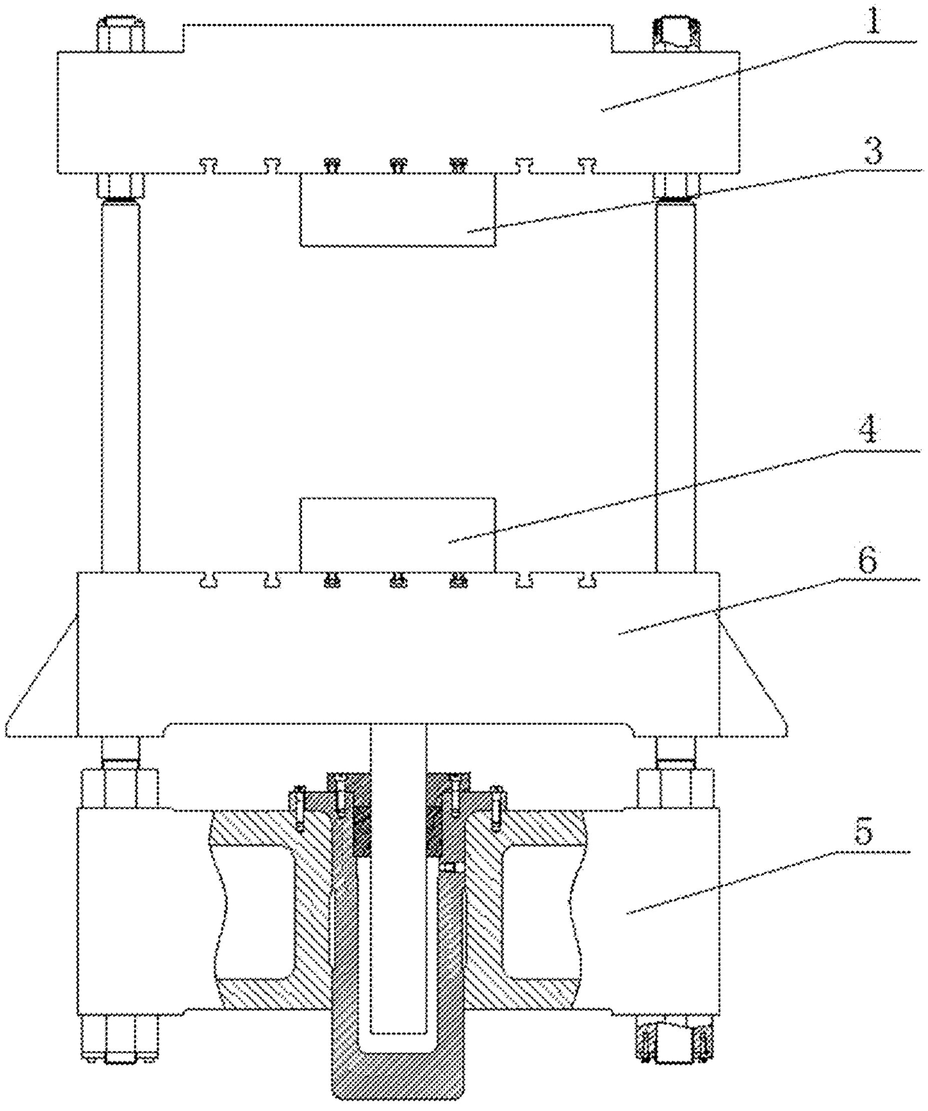
Prior Art FIG. 2
FIG. 2 is a structure diagram of a traditional pull-down hydraulic press.

As shown in FIG. 2, in the traditional pull-down three-crossbeam high-speed forging hydraulic press, there is a fixed crossbeam and a lower crossbeam below the fixed crossbeam underground, thus the underground dimension of the overall pull-down three-crossbeam high-speed forging hydraulic press is large, resulting in a large underground engineering quantity during mounting and inconvenient maintenance. Meanwhile, the sum of the height above ground and the underground height of the pull-down three-crossbeam high-speed forging hydraulic press is also large, which makes the overall mass of the pull-down three-crossbeam high-speed forging hydraulic press large and the cost high. In comparison with the pull-down three-crossbeam high-speed forging hydraulic press, due to the use of the two-crossbeam structure in this technical solution, the overall height of the hydraulic press is greatly reduced, the center of gravity of the equipment is lowered, the operation stability of the equipment is improved, and the maintenance is convenient.

3. The Mass of Moving Parts is Obviously Reduced, and the Production Efficiency of High-Speed Forging is Greatly Improved During the operation of the traditional pull-down hydraulic press, both the upper crossbeam and the lower crossbeam are in a moving state, and the mass of the moving parts is large, for example, as the weight of each crossbeam in the 80MN three-crossbeam high-speed forging hydraulic press is as high as hundreds of tons and the inertia is large, the frequency of high-speed forging of the hydraulic press is greatly reduced. Compared with the traditional pull-down hydraulic press, only one movable crossbeam with a power oil cylinder moves in this technical solution, the mass of the moving part is greatly reduced, the motion inertia is reduced, and thus the forging frequency of the high-speed forging hydraulic press is increased, and the production efficiency is improved.

4. No Hole for Mounting Hydraulic Cylinder is Provided in the Center of the Movable Crossbeam, Thus the Structure is Simple and the Cost is Low Compared with the traditional hydraulic press, the oil cylinder is directly integrated between the movable crossbeam and the column in this technical solution, and no additional hole for mounting the hydraulic cylinder is required to be provided in the center of the movable crossbeam, thus the structure of the movable crossbeam is simple and the cost is low, and the structural strength of the movable crossbeam is guaranteed at the same time.

5. The Press is Large in Overall Rigidity, Small in Elastic Deformation, and Energy-Saving Compared with the traditional three-crossbeam up-acting hydraulic press that upper and lower crossbeams fixed to the ground are required to bear the deformation resistance of a workpiece under forging and undergo elastic deformation during forging, only one fixed crossbeam fixed to the ground undergoes elastic deformation in this technical solution, the overall rigidity of the hydraulic press is improved, the amount of elastic deformation is small, the elastic potential energy stored in the crossbeam is smaller, and this part of elastic potential energy can eventually be wasted in the form of vibration and noise. Therefore, compared with the traditional hydraulic press, the technical solution is more energy-saving.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A lightweight two crossbeam high-speed free forging hydraulic press, comprising:

a fixed crossbeam, for being mounted on the ground;

a movable crossbeam, positioned above or below the fixed crossbeam, wherein an upper die is mounted on the upper one of the movable crossbeam and the fixed crossbeam, a lower die is mounted on the lower one of the movable crossbeam and the fixed crossbeam, and a through hole is provided on the movable crossbeam to serve as an oil cylinder;

a column, provided between the movable crossbeam and the fixed crossbeam, wherein a first axial end of the column is fixedly connected to the fixed crossbeam, a second axial end of the column is provided with a first shoulder to form a sliding fit between a flared piston and the oil cylinder, and one end, close to the fixed crossbeam, of the through hole is provided with a sealing element, thus forming an annular closed oil chamber among the first shoulder, the through hole, the column and the sealing element; when a pressure in the annular closed oil chamber rises, hydraulic oil is able to push the movable crossbeam close to the fixed crossbeam to complete the pressing of a workpiece; and a return oil cylinder, connected between the movable crossbeam and the fixed crossbeam for driving the movable crossbeam away from the fixed crossbeam.

2. The lightweight two crossbeam high-speed free forging hydraulic press according to claim 1, wherein the movable crossbeam is located above the fixed crossbeam.

3. The lightweight two crossbeam high-speed free forging hydraulic press according to claim 1, wherein the through hole is a circular through hole, and the column is a cylindrical column.

4. The lightweight two crossbeam high-speed free forging hydraulic press according to claim 1, wherein the sealing element is an annular end face formed by inward retraction of one end of the through hole close to the fixed crossbeam, and the column is in sealing fit with an inner hole of the annular end face by a sealing ring.

5. The lightweight two crossbeam high-speed free forging hydraulic press according to claim 1, wherein the sealing element is a flange, the flange is mounted on one end, close to the fixed crossbeam, of the through hole by a fastener, and the column is in sealing fit with a flange hole by a scaling ring.

6. The lightweight two crossbeam high-speed free forging hydraulic press according to claim 1, wherein two ends of the movable crossbeam each are provided with a through hole.

7. The lightweight two crossbeam high-speed free forging hydraulic press according to claim 6, wherein the movable crossbeam is a "concave" crossbeam, a notch of the "concave" crossbeam is provided towards the fixed crossbeam, and bulges at two ends of the "concave" crossbeam each are provided with a through hole.

8. The lightweight two crossbeam high-speed free forging hydraulic press according to claim 1, wherein the first axial end of the column is inserted into and in interference fit with the fixed crossbeam; the first axial end of the column is provided with a second shoulder, and a surface of the second shoulder is in contact fit with a surface of one side, close to the movable crossbeam, of the fixed crossbeam.

9. The lightweight two crossbeam high-speed free forging hydraulic press according to claim 1, wherein the first axial end of the column is provided with an external thread, and the first axial end of the column penetrates the fixing crossbeam and then is fixed by a tightening nut; the first axial end of the column is provided with a second shoulder, and a surface of the second shoulder is in contact fit with a surface of one side, close to the movable crossbeam, of the fixed crossbeam.

10. The lightweight two crossbeam high-speed free forging hydraulic press according to claim 1, wherein a cylinder block of the return oil cylinder is connected to the movable crossbeam, and a return plunger of the return oil cylinder is connected to the fixed crossbeam.

11. The lightweight two-crossbeam high-speed free forging hydraulic press according to claim 2, wherein the through hole is a circular through hole, and the column is a cylindrical column.

12. The lightweight two-crossbeam high-speed free forging hydraulic press according to claim 2, wherein the sealing element is an annular end face formed by inward retraction of one end of the through hole close to the fixed crossbeam, and the column is in sealing fit with an inner hole of the annular end face by a sealing ring.

13. The lightweight two-crossbeam high-speed free forging hydraulic press according to claim 2, wherein the sealing element is a flange, the flange is mounted on one end, close to the fixed crossbeam, of the through hole by a fastener, and the column is in sealing fit with a flange hole by a sealing ring.

14. The lightweight two-crossbeam high-speed free forging hydraulic press according to claim 2, wherein two ends of the movable crossbeam each are provided with a through hole.

15. The lightweight two-crossbeam high-speed free forging hydraulic press according to claim 2, wherein the first axial end of the column is inserted into and in interference fit with the fixed crossbeam; the first axial end of the column is provided with a second shoulder, and a surface of the second shoulder is in contact fit with a surface of one side, close to the movable crossbeam, of the fixed crossbeam.

16. The lightweight two-crossbeam high-speed free forging hydraulic press according to claim 2, wherein the first axial end of the column is provided with an external thread, and the first axial end of the column penetrates the fixing crossbeam and then is fixed by a tightening nut; the first axial end of the column is provided with a second shoulder, and a surface of the second shoulder is in contact fit with a surface of one side, close to the movable crossbeam, of the fixed crossbeam.

17. The lightweight two-crossbeam high-speed free forging hydraulic press according to claim 2, wherein a cylinder block of the return oil cylinder is connected to the movable crossbeam, and a return plunger of the return oil cylinder is connected to the fixed crossbeam.

* * * * *